United States Patent
Dutta et al.

(10) Patent No.: US 10,731,487 B2
(45) Date of Patent: Aug. 4, 2020

(54) TURBINE COMPONENTS AND METHODS OF MANUFACTURING

(71) Applicant: GENERAL ELECTRIC COMPANY, Schenectady, NY (US)

(72) Inventors: Sandip Dutta, Greenville, SC (US); Zachary Snider, Simpsonville, SC (US); Srikanth Chandrudu Kottilingam, Greenville, SC (US); Stephen Wassynger, Simpsonville, SC (US); Joseph Moroso, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 287 days.

(21) Appl. No.: 15/437,005

(22) Filed: Feb. 20, 2017

(65) Prior Publication Data
US 2018/0238180 A1 Aug. 23, 2018

(51) Int. Cl.
*F01D 9/04* (2006.01)
*F01D 25/12* (2006.01)
(Continued)

(52) U.S. Cl.
CPC ............ *F01D 9/041* (2013.01); *B22F 3/1055* (2013.01); *B22F 5/04* (2013.01); *B22F 7/08* (2013.01);
(Continued)

(58) Field of Classification Search
CPC .......... F01D 9/041; F01D 5/147; F01D 9/044; F01D 25/12; B22F 5/04; B22F 3/1055;
(Continued)

(56) References Cited

U.S. PATENT DOCUMENTS

2009/0257875 A1 10/2009 McCaffrey et al.
2012/0301317 A1 11/2012 Alvanos et al.
(Continued)

FOREIGN PATENT DOCUMENTS

EP 2878767 A1 6/2015
EP 3 133 245 A1 2/2017
(Continued)

OTHER PUBLICATIONS

International Search Report and Written Opinion issued in connection with corresponding PCT Application No. PCT/US2018/018475 dated May 2, 2018.

*Primary Examiner* — Ryan J. Walters
(74) *Attorney, Agent, or Firm* — McNees Wallace & Nurick LLC

(57) ABSTRACT

At least one turbine component for a gas turbine includes a base component formed by casting and an article. The base component includes a platform. The article on the upper surface of the platform is formed by additive manufacturing. The article has a proximal face sized and shaped to cover at least a portion of the upper surface of the platform of the turbine component and a contoured distal face opposite the proximal face. The contoured distal face has a contour surface serving as at least a portion of a hot gas path surface of the turbine component. The contour surface is arranged and disposed to provide a controlled flow pattern of a working fluid across the contour surface based on a mounting location of the turbine component in a turbine. Methods of manufacturing articles and turbine components are also disclosed.

15 Claims, 5 Drawing Sheets

(51) Int. Cl.
  *B22F 5/04* (2006.01)
  *B22F 3/105* (2006.01)
  *B22F 7/08* (2006.01)
  *F01D 5/14* (2006.01)

(52) U.S. Cl.
  CPC .............. *F01D 5/147* (2013.01); *F01D 9/044* (2013.01); *F01D 25/12* (2013.01); *F05D 2220/32* (2013.01); *F05D 2230/21* (2013.01); *F05D 2230/22* (2013.01); *F05D 2230/237* (2013.01); *F05D 2230/31* (2013.01); *F05D 2230/50* (2013.01); *F05D 2240/128* (2013.01); *F05D 2240/80* (2013.01); *F05D 2240/81* (2013.01); *F05D 2260/202* (2013.01); *Y02P 10/295* (2015.11)

(58) Field of Classification Search
  CPC .... B22F 7/08; F05D 2230/22; F05D 2240/81; F05D 2230/31; F05D 2260/202; F05D 2230/50; F05D 2240/80; F05D 2240/128; F05D 2220/32; F05D 2230/237; F05D 2230/21
  See application file for complete search history.

(56) References Cited

U.S. PATENT DOCUMENTS

| | | |
|---|---|---|
| 2013/0000862 A1* | 1/2013 | Cretegny ............. B22D 11/005 164/61 |
| 2013/0004331 A1 | 1/2013 | Beeck |
| 2013/0171001 A1 | 7/2013 | Garcia-Crespo |
| 2014/0248512 A1* | 9/2014 | Kamel .................. C23C 28/021 428/686 |
| 2015/0064020 A1 | 3/2015 | Beeck |
| 2015/0152736 A1* | 6/2015 | Liang ...................... F01D 5/186 415/115 |
| 2016/0363054 A1 | 12/2016 | Miranda et al. |
| 2017/0306775 A1 | 10/2017 | Hoskin |
| 2018/0119570 A1 | 5/2018 | Lacy et al. |
| 2018/0128174 A1 | 5/2018 | Burnos et al. |

FOREIGN PATENT DOCUMENTS

| | | |
|---|---|---|
| EP | 3 236 014 A1 | 10/2017 |
| JP | 2006188962 A | 7/2006 |
| WO | 2015/017093 A1 | 2/2015 |

* cited by examiner

TURBINE COMPONENTS AND METHODS OF MANUFACTURING

FIELD OF THE INVENTION

The present embodiments are directed to turbine components and methods of manufacturing articles and turbine components. More specifically, the present embodiments are directed toward turbine components with customizable hot gas path surfaces and surface cooling features and methods of manufacturing such turbine components.

BACKGROUND OF THE INVENTION

During operation, high-temperature combustion gases flow through different portions of many gas turbine engines. These high-temperature combustion gases flow over and/or adjacent to various hot gas path components within the gas turbine engine, exposing the components to elevated temperatures during normal operation. As gas turbines are modified to increase efficiency and decrease cost, the temperatures within the hot gas path are being increased while the geometries of the components are becoming more complex. In order to continue increasing the temperatures within the hot gas path, the turbine components in this area must be constructed of materials which can withstand such temperatures.

Conventional discrete transition pieces mounted at discrete clock positions between segments alter the hot gas flow through an otherwise substantially annular channel, particularly along the outer wall of the annular channel. Each conventional non-rotating turbine component is also mounted at a fixed clock position, but the transition piece spacing is not the same as the turbine component spacing.

Turbine components in a particular row in a gas turbine engine, however, are conventionally designed to all have substantially the same structure. Cooling channels in the turbine components are limited by the fabrication techniques. For a non-rotating nozzle, the contour of the nozzle platform and the location of cooling channels in the nozzle platform affect the efficiency of flow of the hot gas past the nozzle, the efficiency of the gas turbine, the efficiency and uniformity of cooling of the nozzle platform, and the effective lifespan of the nozzle platform.

BRIEF DESCRIPTION OF THE INVENTION

In an embodiment, a method of manufacturing includes additive manufacturing an article having a proximal face sized and shaped to cover at least a portion of an upper surface of a platform of a base component and a contoured distal face opposite the proximal face. The base component and the article together form a turbine component. The contoured distal face of the article has a contour surface serving as at least a portion of a hot gas path surface of the turbine component. The contour surface is arranged and disposed to provide a controlled flow pattern of a working fluid across the contour surface based on a mounting location of the turbine component in a turbine.

In another embodiment, a method of manufacturing includes additive manufacturing a set of articles for a set of base components. Each article has a proximal face sized and shaped to cover at least a portion of an upper surface of a platform of one of the set of base components and a contoured distal face opposite the proximal face. The base component and the article together form a turbine component. Each contoured distal face has a contour surface serving as at least a portion of a hot gas path surface of the turbine component. Each contour surface is arranged and disposed to provide a controlled flow pattern of a working fluid across the contour surface based on a mounting location of the turbine component in a turbine.

In another embodiment, at least one turbine component for a gas turbine includes a base component formed by casting and an article. The base component includes a platform. The article on the upper surface of the platform is formed by additive manufacturing. The article has a proximal face sized and shaped to cover at least a portion of the upper surface of the platform of the turbine component and a contoured distal face opposite the proximal face. The contoured distal face has a contour surface serving as at least a portion of a hot gas path surface of the turbine component. The contour surface is arranged and disposed to provide a controlled flow pattern of a working fluid across the contour surface based on a mounting location of the turbine component in a turbine.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are articles, base components, turbine components, and methods of manufacturing of articles, base components, and turbine components.

Embodiments of the present disclosure, for example, in comparison to concepts failing to include one or more of the features disclosed herein, permit a reduction of chargeable coolant flow, increase turbine engine efficiency, increase the overall efficiency of flow of the hot gas past the nozzles, permit the same casting to be used on multiple turbine engines, permit customization of turbine components based on the clock position of their mounting, provide enhanced cooling techniques, provide a surface curvature fine-tuned for a turbine component's specific clock location, increase the efficiency of the gas turbine, increase the efficiency and uniformity of cooling of a hot gas path surface, increase the effective lifespan of the hot gas path surface and hence of the turbine component, or combinations thereof.

Figure 1:
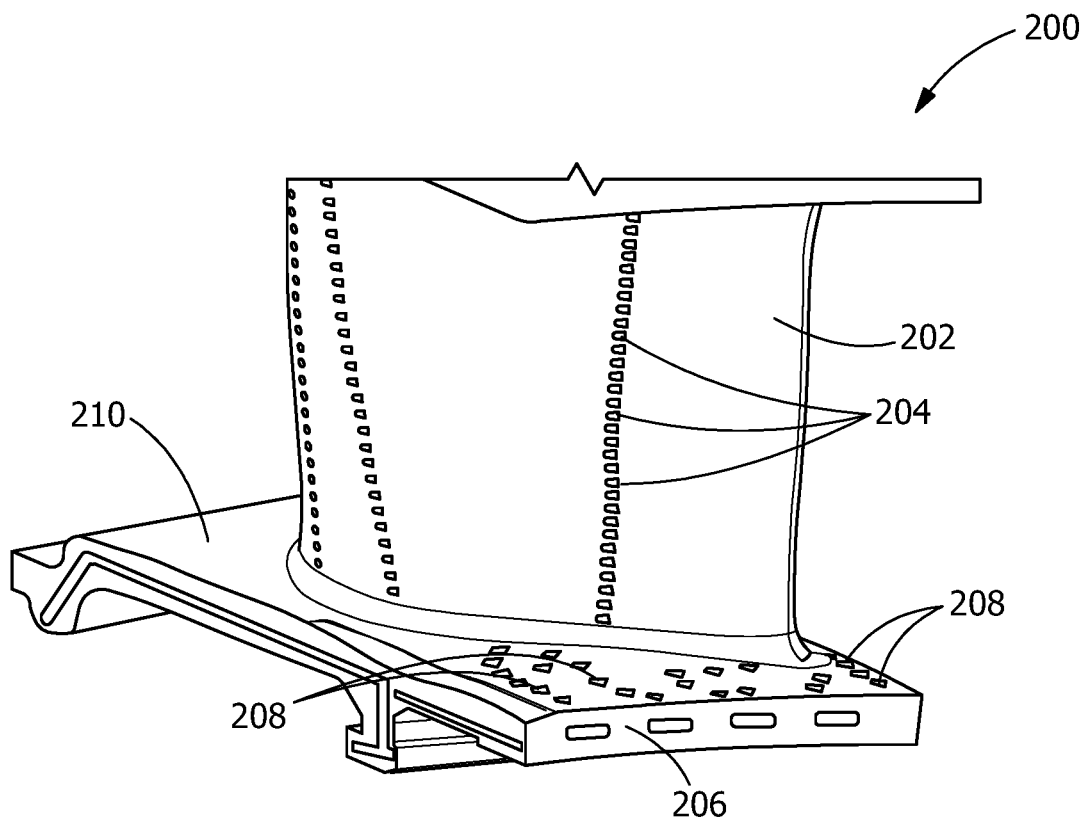
FIG. 1 is a schematic perspective view of a turbine component with a cast end wall core including wall cooling features and airfoil film cooling holes.

Referring to FIG. 1, the turbine component 200 includes an airfoil 202 with rows of film cooling holes 204. The turbine component 200 is a turbine nozzle. The airfoil 202 extends from a platform 206 that includes surface cooling features 208. The airfoil 202 is integral with the platform 206. In FIG. 1, the wall cooling features 208 are film cooling holes. Forming the turbine component 200 by casting decreases the manufacturing cost but limits the contour of the wall cooling features 208 and does not permit variability in the contour of the hot gas path surface 210 of the platform 206. The hot gas path surface 210 is an end wall.

Figure 2:
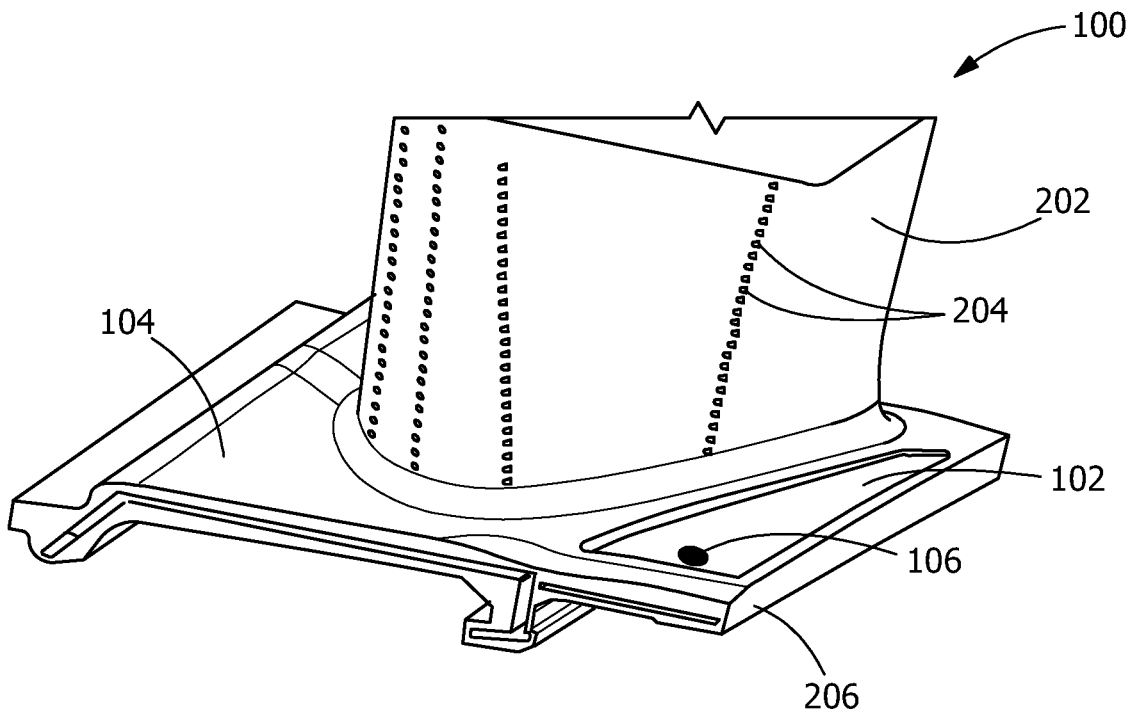
FIG. 2 is a schematic perspective view of a base component in an embodiment of the present disclosure.

Referring to FIG. 2, a base component 100 includes an airfoil 202 with rows of film cooling holes 204. The airfoil 202 extends from a platform 206 that includes a recess 102 in the upper surface 104 of the platform 206. A supply passage 106 fluidly connects the recess 102 with a cooling fluid supply line. The airfoil 202 is integral with the platform 206. The base component 100 is preferably formed by casting, which decreases the manufacturing cost.

Figure 3:
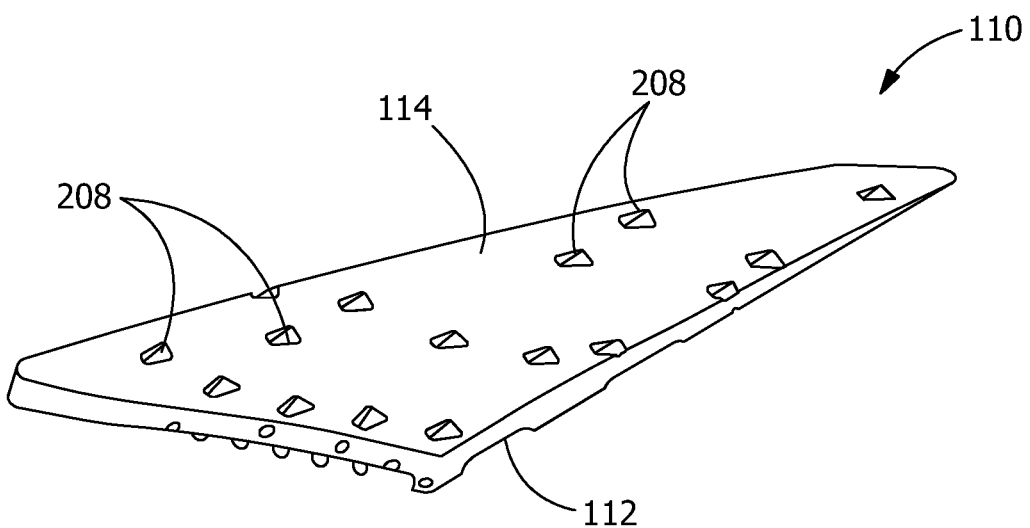
FIG. 3 is a schematic perspective view of an article in an embodiment of the present disclosure.
Figure 4:
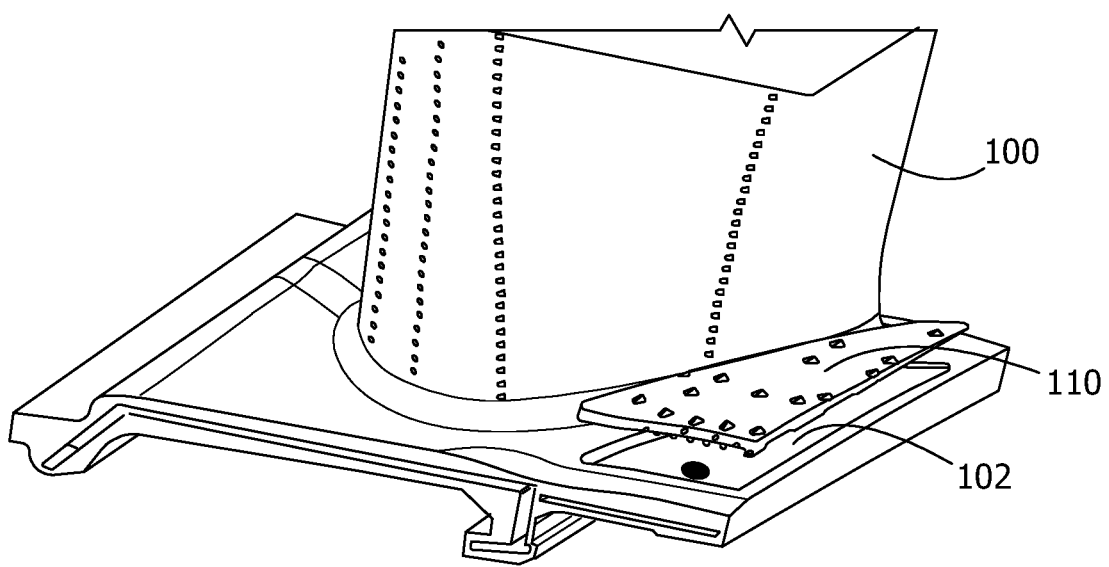
FIG. 4 is a schematic perspective view of the article of FIG. 3 being placed on the base component of FIG. 2.

Referring to FIG. 3, an article 110 is sized and shaped to fit in the recess 102. The article 110 includes a proximal face 112 sized and shaped to cover at least a portion of the upper surface 104 of the base component 100. The article also includes a contoured distal face 114 opposite the proximal face 112. The contoured distal face 114 has a contour surface arranged and disposed to provide a controlled flow pattern of a working fluid across the contour surface based on a mounting location of the base component 100 in a turbine. The article 110 also includes wall cooling features 208. In FIG. 3, the wall cooling features 208 are film cooling holes. In some embodiments, the article 110 contains an advanced cooling circuit that may contain film holes as shown in FIG. 3. The article 110 may also contain microchannel surfaces to be covered with another article 110 in the form of a pre-sintered preform (PSP). FIG. 4 shows the article 110 being placed in the recess 102 of the base component 100.

Figure 5:
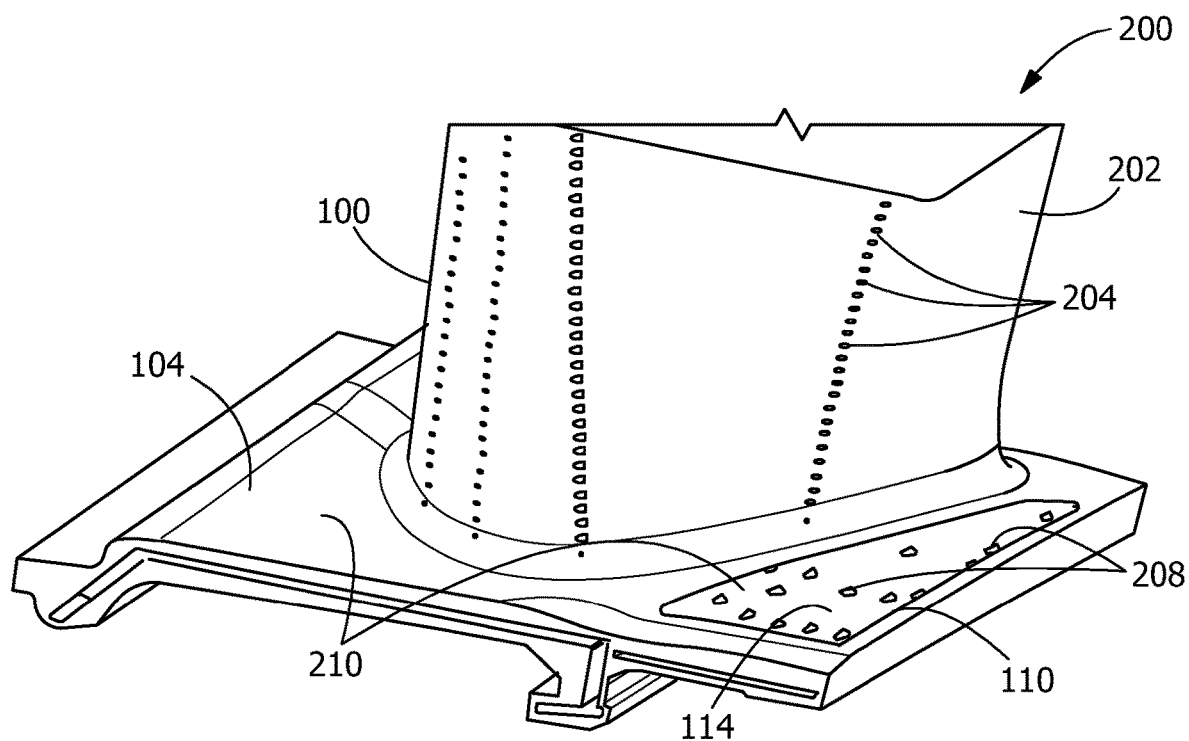
FIG. 5 is a schematic perspective view of a turbine component with the article of FIG. 3 on the base component of FIG. 2.

Referring to FIG. 5, the turbine component 200 includes the base component 100 and the article 110 placed and affixed in the recess 102 on the upper surface 104 of the base component 100. The wall cooling features 208 of the article 110 are in fluid communication with the supply passage 106 of the base component 100. The hot gas path surface 210 of the turbine component 200 includes part of the upper surface 104 of the base component 100 and the contoured distal face 114 of the article 110.

Figure 6:
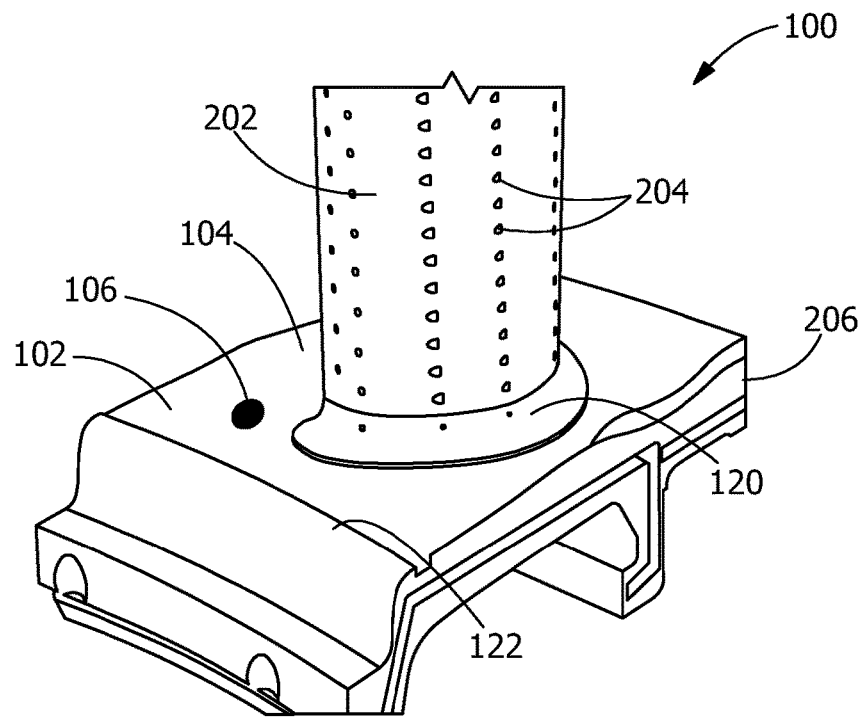
FIG. 6 is a schematic perspective view of a base component with a front wall in an embodiment of the present disclosure.

Referring to FIG. 6, a base component 100 includes an airfoil 202 with rows of film cooling holes 204. The airfoil 202 extends from a platform 206 that includes a recess 102 in the upper surface 104 of the platform 206. The recess 102 covers all or substantially all of the upper surface 104 of the platform 206. The base component 100 in FIG. 6 includes a supply passage 106 fluidly connecting the recess 102 with a cooling fluid supply line, but the base component 100 may alternatively not include such a supply passage 106 in other embodiments. The airfoil 202 is integral with the platform 206. The base component 100 is preferably formed by casting, which decreases the manufacturing cost. The base component 100 includes an airfoil lip 120 and a front lip 122 to aid in positioning the article 110 on the platform 206.

Figure 7:
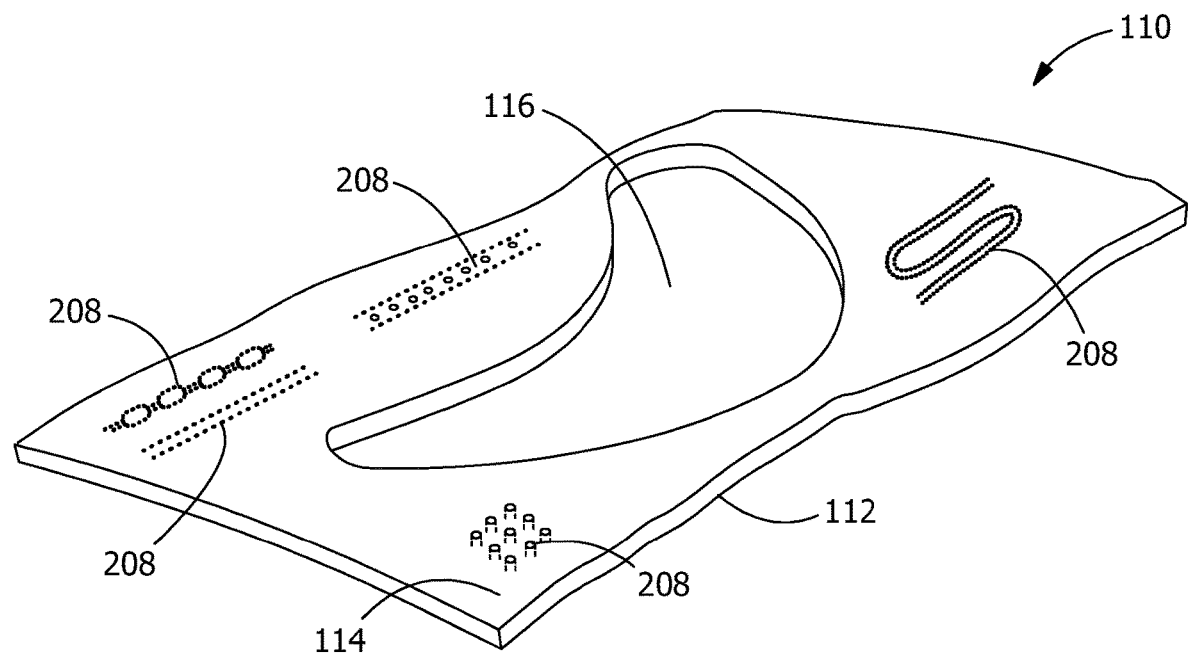
FIG. 7 is a schematic perspective view of another article in an embodiment of the present disclosure.

Referring to FIG. 7, an article 110 is sized and shaped to fit in the recess 102. The article 110 includes a proximal face 112 sized and shaped to cover all or substantially all of the upper surface 104 of the base component 100. The article also includes a contoured distal face 114 opposite the proximal face 112. The contoured distal face 114 has a contour surface arranged and disposed to provide a controlled flow pattern of a working fluid across the contour surface based on a mounting location of the base component 100 in a turbine. The article also includes a central airfoil opening 116 through which the airfoil 202 extends in the turbine component 200.

Figure 8:
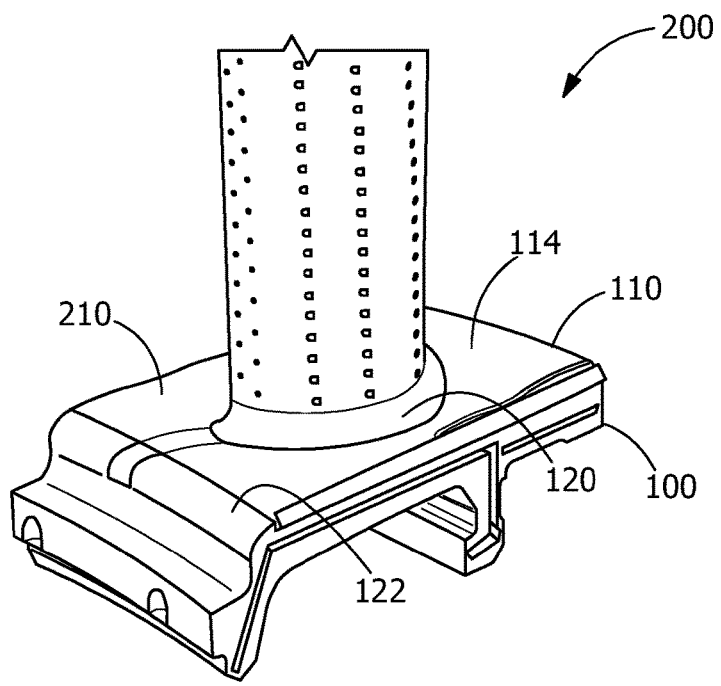
FIG. 8 is a schematic perspective view of a turbine component with the article of FIG. 6 on the base component of FIG. 7.

An article 110 may have one or more wall cooling features 208 that may be cooling channels, cooling holes, or film cooling holes, as shown in FIG. 7. Wall cooling features 208 may include, but are not limited to, pin banks, simple channels, turbulated channels, serpentine channels, impingement channels, and combinations thereof. FIG. 8 shows the article 110 of FIG. 7 placed and affixed in the recess 102 on the upper surface 104 of the base component 100 of FIG. 6 to form the turbine component 200. The front edge of the article 110 meets the front lip 122 and the edge of the airfoil opening 116 of the article 110 meets the airfoil lip 120. The contoured distal face 114 of the article 110 forms substantially all of the hot gas path surface 210 of the turbine component 200.

Figure 9:
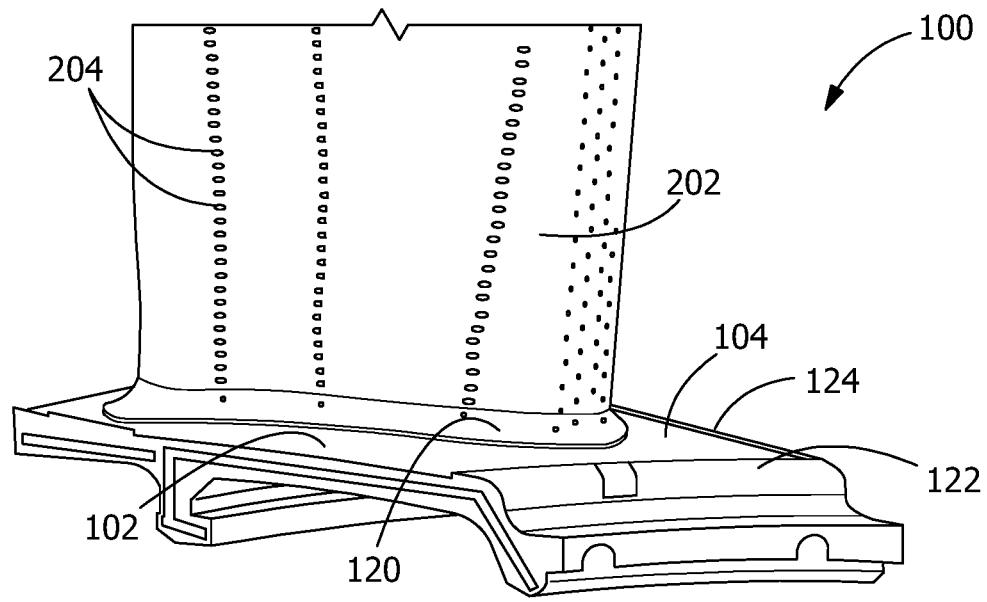
FIG. 9 is a side schematic perspective view of a base component with a front wall and a side wall in an embodiment of the present disclosure.

Referring to FIG. 9, a base component 100 includes an airfoil 202 with rows of film cooling holes 204. The airfoil 202 extends from a platform 206 that includes a recess 102 in the upper surface 104 of the platform 206. The recess 102 covers all or substantially all of the upper surface 104 of the platform 206. The base component 100 in FIG. 8 does not include a supply passage 106 fluidly connecting the recess 102 with a cooling fluid supply line, but the base component 100 may include such a supply passage 106 in other embodiments. The airfoil 202 is integral with the platform 206. The base component 100 is preferably formed by casting, which decreases the manufacturing cost. The base component 100 includes an airfoil lip 120, a front lip 122, and a side lip 124 to aid in positioning the article 110 on the platform 206. The addition of the side lip 124 allows the article 110 to be better positioned on the base component 100 of FIG. 9 than the base component 100 of FIG. 6, which lacks such a side lip 124.

Figure 10:
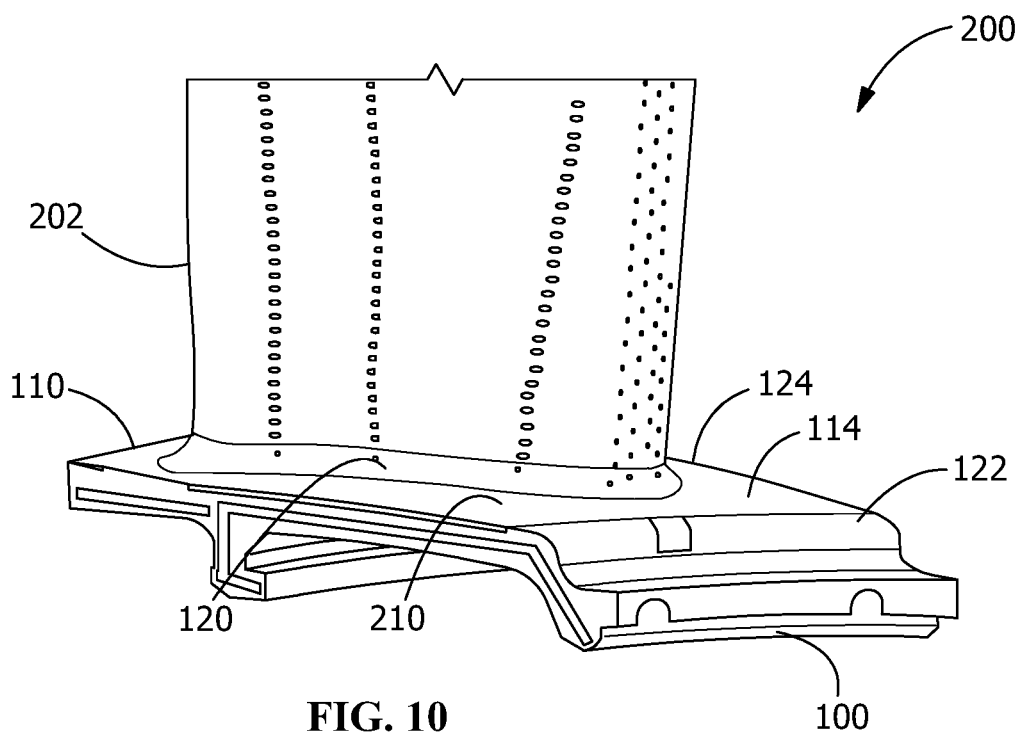
FIG. 10 is a side schematic perspective view of a turbine component with an article on the turbine component of FIG. 9.

FIG. 10 shows the article 110 of FIG. 7 placed and affixed in the recess 102 on the upper surface 104 of the base component 100 of FIG. 9 to form the turbine component 200. The front edge of the article 110 meets the front lip 122, the side edge of the article 110 meets the side lip 124, and the edge of the airfoil opening 116 of the article 110 meets the airfoil lip 120. The contoured distal face 114 of the article 110 forms substantially all of the hot gas path surface 210 of the turbine component 200.

For non-rotating turbine components 200, the flow pattern of the hot gas past a row of turbine components 200 may differ for each turbine component 200 in the row, particularly as a result of the relative location of the upstream transition pieces with respect to each turbine component 200. In other words, the hot gas flow distribution for each turbine component 200 differs depending on its clock mounting location. For a particular arrangement, however, the hot gas flow and temperature distribution are predictable and reproducible, at least to a certain extent, and may be determined empirically or by modeling such that a customized contoured distal face 114 and/or customized wall cooling features 208, which may be cooling channels and/or film cooling holes, may be provided to increase flow efficiency and cooling uniformity at the hot gas path surface 210 or the turbine component 200 based on the predetermined hot gas flow and temperature distribution, thereby increasing overall efficiency of the turbine and part life.

The turbine component 200 may be any component that experiences a different hot gas flow past its surface based on its clock mounting location. As such, the turbine component 200 is preferably a non-rotating component. Turbine components 200 experiencing a different hot gas flow past its surface based on its clock mounting location may include, but are not limited to, turbine nozzles, turbine shrouds, and turbine blades.

In some embodiments, the shape and location of the customized contoured distal face 114 and/or customized wall cooling features 208 are developed based on computer modeling of the hot gas flow. Since it is expensive to maintain different castings for the same type of base component 100, a customized contoured distal face 114 and/or customized wall cooling features 208 are preferably manufactured on top of a set of base components 100 from a single casting, where the shape of the customized contoured distal face 114 and/or customized wall cooling features 208 is based on the location of the turbine component 200 in the engine with respect to the clock mounting location and other components.

The article 110 may be manufactured by any additive manufacturing method or technique including melting or sintering layers of a powder material. In some embodiments, the additive manufacturing or three-dimensional (3D) printing includes selective laser sintering (SLS), direct metal laser sintering (DMLS), selective laser melting (SLM), direct metal laser melting (DMLM), electron beam melting (EBM), powder bed processing, or combinations thereof. In some embodiments, the additive manufacturing or 3D printing includes SLS with a powder bed. The article 110 may alternatively be manufactured by brazing of thin metal sheets of PSP.

In some embodiments, the additive manufacturing of the article 110 is a direct metal laser melting (DMLM) process building an article 110 that is customized in its contoured distal face 114 and/or its wall cooling features 208 for a base component 100 based on a clock mounting location of the base component 100 in a gas turbine. In some embodiments, the DMLM process is performed with a powder delivery assembly including one or more powder material feeders. During the DMLM process, the powder material feeders selectively deliver the powder material and/or any other material directly as a new layer on the powder bed above the printing platform or alternatively to the surface, where at least one spreader directs the powder material toward the printing platform.

In some embodiments, the custom wall cooling features 208 and custom contoured distal face 114 of the article 110 are based on an expected or predetermined hot gas flow pattern at the clock mounting location of the base component 100. In some embodiments, the article 110 is built, such as, for example, by additive manufacturing, directly on top of a base component 100. In other embodiments, the article 110 is built separately and is attached to the base component 100 by a joining technique. In some embodiments, the joining technique may include, but is not limited to, brazing, sintering, welding, direct additive manufacturing on the cast base component 100, or a combination thereof.

In some embodiments, the base component 100 has a recess 102 to receive the article 110 and one or more coolant supply passages 106 to supply the wall cooling features 208 of the article 110, thereby making manufacturing easier and less expensive. The surface contour of the proximal face 112 and/or the contoured distal face 114 of the article 110 preferably does not match the surface contour of the recess 102 and/or the upper surface 104 of the platform 206 of the base component 100 over which the article 110 is placed. The article 110 preferably includes one or more wall cooling features 208, with the base component 100 only having a supply passage 106 for supplying cooling fluid to the wall cooling features 208. The wall cooling features 208 of the article 110 may include complex shapes that would otherwise be too costly to implement if not formed by additive manufacturing. The wall cooling features 208 preferably address local heat loads at the hot gas path surface 210 of the turbine component 200.

In some embodiments, a turbine component 200 may include a base component 100 with both a first article 110, such as shown in FIG. 3, in a recess 102 on the upper surface 104 of the platform 206 of the base component 100, and a second article 110, such as shown in FIG. 7, covering the rest of the upper surface 104 of the platform 206 of the base component 100 and the contoured distal face 114 of the first article 110. Wall cooling features 208 may be located in the first article 110, in the first article 110 and the second article 110, or in neither the first article 110 nor the second article 110.

In some embodiments, the base component 100 may include more than one recess 102 on the upper surface 104 of the platform 206, where each recess 102 receives an article 110 such as shown in FIG. 3.

In some embodiments, the wall cooling features 208 extend through the surface of the hot gas path surface 210 as film cooling holes, as shown in FIG. 3, to release the cooling fluid through the surface of the hot gas path surface 210 and into the hot gas flow stream. In some embodiments, the wall cooling features 208 are near-surface channels that circulate a coolant near but below the surface of the hot gas path surface 210, as shown in FIG. 7.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method of manufacturing comprising:
additive manufacturing an article having a proximal face sized and shaped to cover at least a portion of an upper surface of a platform of a base component and a contoured distal face opposite the proximal face, the base component and the article together forming a turbine component, the contoured distal face of the article having a contour surface serving as at least a portion of a hot gas path surface of the turbine component, the contour surface being arranged and disposed to provide a controlled flow pattern of a working fluid across the contour surface, the contour surface being customized based on a clock mounting location of the turbine component in a turbine and a hot gas flow determined empirically or by modelling at the clock mounting location, the base component being formed by casting; wherein the article includes at least a portion of at least one wall cooling feature customized based on the clock mounting location of the turbine component in the turbine.

2. The method of claim 1 further comprising brazing the article to the platform of the base component.

3. The method of claim 1, wherein the additive manufacturing of the article occurs directly on the platform of the base component.

4. The method of claim 1 further comprising casting the base component.

5. The method of claim 1, wherein the turbine is a gas turbine.

6. The method of claim 1, wherein the turbine component is a nozzle comprising the platform and an airfoil portion extending from the platform.

7. The method of claim 1 further comprising inserting the article into a recess on the upper surface of the platform of the base component.

8. The method of claim 1 further comprising covering the upper surface of the base component with the article.

9. The method of claim 1, wherein the portion of the at least one wall cooling feature comprises at least one film cooling hole.

10. The method of claim 9, wherein the method comprises forming the at least one film cooling hole in the contoured distal face.

11. A method of manufacturing comprising:
additive manufacturing a set of articles for a set of base components, each article of the set of articles having a proximal face sized and shaped to cover at least a portion of an upper surface of a platform of one of the set of base components and a contoured distal face opposite the proximal face, each one of the set of base components and each article together forming a turbine component, each contoured distal face having a contour surface serving as at least a portion of a hot gas path surface of the turbine component, each contour surface being arranged and disposed to provide a controlled flow pattern of a working fluid across the contour surface, each contour surface being customized based on a clock mounting location of the turbine component in a turbine and a hot gas flow determined empirically or by modelling at the clock mounting location, the set of base components being formed by casting; wherein each article includes at least a portion of at least one wall cooling feature customized based on the clock mounting location of the turbine component in the turbine.

12. The method of claim 11 further comprising casting the set of base components from a single casting.

13. The method of claim 11, wherein the turbine components are nozzles, each nozzle comprising the platform and an airfoil portion extending from the platform, and the turbine is a gas turbine.

14. The method of claim 11, wherein the portion of the at least one wall cooling feature comprises at least one film cooling hole.

15. The method of claim 14, wherein the method comprises forming the at least one film cooling hole in the contoured distal face.

* * * * *